United States Patent
Kobayashi et al.

[11] Patent Number: 5,488,594
[45] Date of Patent: Jan. 30, 1996

[54] OBJECTIVE ACTUATOR FOR POSITIONING AN OPTICAL PICK-UP DEVICE

[75] Inventors: Fumio Kobayashi; Ikuo Kasuga; Akira Miyamae, all of Nagano, Japan

[73] Assignee: K. K. Sankyo Seiki Seisakusho, Nagano, Japan

[21] Appl. No.: 110,960

[22] Filed: Aug. 24, 1993

[30] Foreign Application Priority Data

| Aug. 24, 1992 | [JP] | Japan | 4-064732 U |
| Aug. 24, 1992 | [JP] | Japan | 4-064733 U |
| Jun. 11, 1993 | [JP] | Japan | 5-036788 U |

[51] Int. Cl.⁶ ................................ G11B 7/00
[52] U.S. Cl. ........................ 369/44.14; 369/44.17
[58] Field of Search .............. 369/44.17, 44.21, 369/44.22, 44.14; 359/813, 823; 425/129.1

[56] References Cited

U.S. PATENT DOCUMENTS

| 3,888,568 | 6/1975 | Norris et al. | 359/823 |
| 4,838,649 | 6/1989 | Ichikawa et al. | 369/44.21 |
| 4,998,802 | 3/1991 | Kasuga et al. | 369/44.22 |
| 5,103,438 | 4/1992 | Masunaga et al. | 369/44.22 |
| 5,132,850 | 7/1992 | Hagiwara | 369/44.22 |

FOREIGN PATENT DOCUMENTS

| 62-267927 | 11/1987 | Japan | 369/44.22 |
| 63-129524 | 6/1988 | Japan | 369/44.17 |
| 1-307029 | 12/1989 | Japan | |
| 04028023 | 1/1992 | Japan | 369/44.21 |

Primary Examiner—Georgia Y. Epps
Assistant Examiner—P. W. Huber
Attorney, Agent, or Firm—Sughrue, Mion, Zinn, Macpeak & Seas

[57] ABSTRACT

Disclosed is an objective actuator comprising an object lens holder for holding an object lens, the object lens holder being mounted on a support shaft in a manner that the object lens holder is slidable along and rotatable about the support shaft; a drive coil mounted on the object lens holder; first yoke provided with drive magnets, the first yoke being mounted in such manner that the drive magnets confront with the drive coil, the first yoke having a center hole which is larger in diameter than the support shaft, the first yoke and the support shaft are integrally connected by molding; and shaft holding member defined by filling a resin at the center hole of the first yoke, the shaft holding member including a base portion.

10 Claims, 8 Drawing Sheets

OBJECTIVE ACTUATOR FOR POSITIONING AN OPTICAL PICK-UP DEVICE

BACKGROUND OF THE INVENTION

1. Field of the Invention

The present invention-relates to an objective actuator which is set for example, with an optical pick-up device.

2. Related Art

The optical pick-up device is used for writing data signals into and reading the same out of an optical disk as a recording media in an optical disk device.

In the optical pick-up device, it is essential to exactly focus laser beams at data pits on the optical disk. To this end, an objective actuator is used which drives the objective or object lens to look constantly in the direction of the optical axis irrespective of vibration and swing motions of the optical disk.

An example of the conventional objective actuators used for the optical pick-up device, for example, will be described. An objective holder is supported by a support shaft in such a manner so that it is rotatable about the support shaft and movable in the axial direction of the support shaft. A focusing drive coil and a tracking drive coil are mounted on the objective holder. A focusing drive magnet and a tracking drive magnet are mounted on a yoke. The arrangement is made such that the focusing and tracking drive coils face the focusing and tracking drive yokes, respectively. This objective actuator is disclosed in Published Unexamined Japanese Patent Application No. Hei. 1- 307029, filed by the applicant of the present patent application.

A key portion of the conventional objective actuator is illustrated in FIG. 22. A first yoke 91 and a second yoke 93, both being pressed shaped, are disposed as shown and laminated one upon the other by adhesive, for example. A support shaft 90 is fixed by press fitting it into the center hole 98 of the first yoke 91. An objective holder 97 is supported by the support shaft 90 in a manner that it is rotatable about the support shaft 90 and movable in the axial direction of the support shaft 90. An object lens, not shown, and a drive coil 96 are secured to the objective holder 97. The drive coil 96 confronts with the inner circumferential surface of a drive magnet 95, which is secured to the inner circumferential surface of the first yoke 91 in a state that a proper gap is present between the drive coil 96 and the inner circumferential surface of a drive magnet 95. The drive coil 96 consists of a focusing drive coil and a tracking drive coil. The drive magnet 95 consists of a focusing drive magnet and a tracking drive magnet. For focusing control, a controlled current is fed to the focusing drive coil, so that the object lens, together with the objective holder 97, is moved in the axial direction of the support shaft 90. For tracking control, a control current is fed to the tracking drive coil, so that the object lens, together with the objective holder 97, is turned about the support shaft 90.

In the conventional objective actuator, the support shaft 90 is fixed by press fitting it into the center hole 98 of the first yoke 91, as described above. Accordingly, the verticality of the center hole 98 of the first yoke 91 is slightly lost when the first yoke 91 is press shaped. The support shaft 90 is also slightly lost in its verticality when it is press fit into the center hole 98. Those slight deviations of verticality are accumulated to create a noticeable inclination of the support shaft 90. The inclination of the support shaft 90 adversely affects the performances of the assembled product or the objective actuator.

Further, it brings about complication of the assembling work, and hence elongation of the time to assemble. To secure a smooth shift of the objective holder 97 along the support shaft 90 and a smooth turn of the objective holder 97 about the support shaft 90, the outer surface of the support shaft 90 is coated with resin (e.g., Teflon, trade name). In this case, the support shaft 90 must be coated except the insertion part 94 of the support shaft where it is inserted into the center hole 98 of the first yoke 91 for fixing the support shaft 90. For this reason, before the coating is performed, the insertion part 94 is masked so as to allow only the portion of the support shaft 90 along which the objective holder 97 moves to be coated. As a result, the coating process is made complicated. When the support shaft 90 is press fit into the center hole of the first yoke 91, the coating surface of the support shaft tends to be damaged.

SUMMARY OF THE INVENTION

In view of the forgoing problem, the present invention has been made and has an object to provide an objective actuator in which the verticality of the support shaft for rotatably and axially movably supporting the objective holder is excellent, the assembling work is simple, and the resin coating of the support shaft is little damaged in the stage of assembling.

Another object of the present invention is to provide an objective actuator in which the positioning of the drive magnets is easy.

Still another object of the present invention is to provide an objective actuator in which the adjustment of the inclination of the whole device is easy.

Another object of the present invention is to provide an objective actuator in which the second yoke is easily assembled.

According to one aspect of the present invention, there is provided an objective actuator comprising an object lens holder for holding an object lens, the object lens holder being mounted on a support shaft in a manner that the object lens holder is slidable along and rotatable about the support shaft; a drive coil mounted on the object lens holder; first yoke provided with drive magnets, the first yoke being mounted in such manner that the drive magnets confront with the drive coil, the first yoke having a center hole which is larger in diameter than the support shaft, the first yoke and the support shaft are integrally connected by molding; and shaft holding member defined by filling a resin at the center hole of the first yoke, the shaft holding member including a base portion.

According to another aspect of the present invention, there is provided an objective actuator comprising an object lens holder for holding an object lens, the object lens holder being mounted on a support shaft in a manner that the object lens holder is slidable along and rotatable about the support shaft; a drive coil mounted on the object lens holder; and first yoke provided with drive magnets, the first yoke being mounted in such manner that the drive magnets confront with the drive coil, wherein the support shaft is integrally formed by molding together with the first yoke.

According to another aspect of the present invention, there is provided an objective actuator comprising a frame; an objective drive device having a objective, the objective drive device movable in a disk radius direction and a disk track direction with respect to the frame; and tilt angle adjust means for adjusting an tilt angle of the optical axis of the objective through the rotation of the objective drive device with respect to the frame.

According to another aspect of the present invention, there is provided an objective actuator comprising an object lens holder for holding an object lens, the object lens holder being mounted on a support shaft in a manner that the object lens holder is slidable along and rotatable about the support shaft; a base member for fixing the support shaft; and drive means for driving the object lens holder in such a manner that the object lens holder rotates about the support shaft and moves in the direction of the support shaft, wherein the base member and the support shaft are integrally formed by molding.

According to the present invention, the center holes of the yokes which are larger in diameter than the support shaft supporting the objective lens holder. The support shaft, and the yokes are coupled into a one-piece construction by the integrally molding process. Resin filling the holes of the yokes forms the base. Accordingly, the mold, if manufactured with a high precision, almost eliminates the inclination of the support shaft, thereby improving the device precision and yield. Further, when the coated support shaft, even if entirely coated, is subjected to a mold process, the coating will not be peeled off. Therefore, there is eliminated the troublesome work to mask only a part of the support shaft before it is coated.

Additionally, the positioning parts for positioning the drive magnets against the yokes are also formed by the integrally molding process. Therefore, no provision of an additional step to provide the reference surfaces for positioning the drive magnets is required. This is advantageous in the cost to manufacture and device precision.

The adjust surface for adjusting a tilt angle of the support shaft is formed in the base. Accordingly, when the base is integrally formed by molding, the adjust surface is also formed simultaneously. Also in this respect, the cost reduction and the precision improvement are realized.

Furthermore, first and second yokes are oppositely disposed with the drive coil located therebetween. The support shaft and the first and second yokes are coupled together by the integrally molding. Accordingly, the objective actuator having the first and second yokes can be manufactured in a simple manner and with a reduced cost.

Further, the present invention has the following beneficial effects.

The support shaft, together with the outer and inner yokes as the first and second yokes, is integrally formed by the molding. There is eliminated an additional process step for forming the support shaft. The formation of the support shaft is very simple. When the well slidable resin is used, there is no need of coating the surface of the support shaft. Accordingly, the coating film damage and peel-off problems will not be created. Accordingly, the resultant objective actuator is extremely reliable. The resin has an excellent vibration impeding function. Accordingly, the resin support shaft impedes harmful vibration to allow little vibration to be transmitted to the movable unit. This improves the performance of the optical pick-up device.

Additionally, the positioning parts for positioning the drive magnets against the yokes are also formed by the integrally molding process. Therefore, no provision of an additional step to provide the reference surfaces for positioning the drive magnets is required. This is advantageous in the cost to manufacture and device precision.

The base has the adjust surface for adjusting a tilt angle of the support shaft. Accordingly, when the base is integrally formed by molding, the adjust surface is also formed simultaneously. Also in this respect, the cost reduction and the precision improvement are realized.

Furthermore, first and second yokes are oppositely disposed with the drive coil located therebetween. The first and second yokes are coupled together by the integrally molding. Accordingly, the objective actuator having the first and second yokes can be manufactured in a simple manner and with a reduced cost.

According to the present invention, the adjust screw for adjusting the tilt angle in the disk radius direction is screwed into the objective actuator through the hole. The adjust screw for adjusting the tilt angle in the disk track direction is screwed into the objective actuator through the elongated hole extended in the disk track direction, which allows the movement only in the disk track direction. The elongated hole 60 minimizes a rotational play of the objective actuator against the frame. A positional variation of the object lens at a natural position is reduced.

After the tilt angle in the disk radius direction A is adjusted by the adjust screw, the tilt angle in the disk track direction is adjusted by the adjust screw. In this adjusting method, if the tilt angle in the disk radius direction is deviated as the result of adjustment of the tilt angle in the disk track direction by the adjust screw, the deviation created is slight in quantity. Since the deviation of the tilt angle in the disk radius direction has a less influence on the jitter characteristic of the optical pick-up device when operating in a playback mode than the deviation of the tilt angle in the disk track direction, the adjusting method is sure to provide a tilt angle adjust mechanism for an optical pick-up device with excellent jitter performance.

DETAILED DESCRIPTION OF THE PREFERRED EMBODIMENTS

A first embodiment of an objective actuator according to the present invention will be described with reference to the accompanying drawings.

Figure 1:
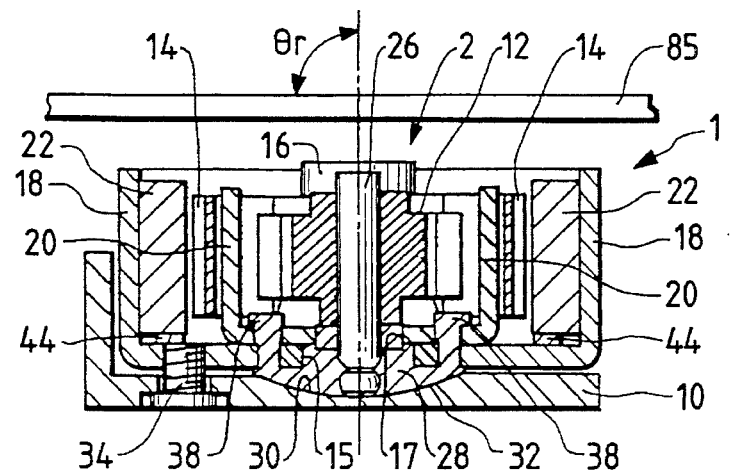
FIG. 1 is a sectional side elevation showing a first embodiment of an objective actuator according to the present invention.
Figure 2:
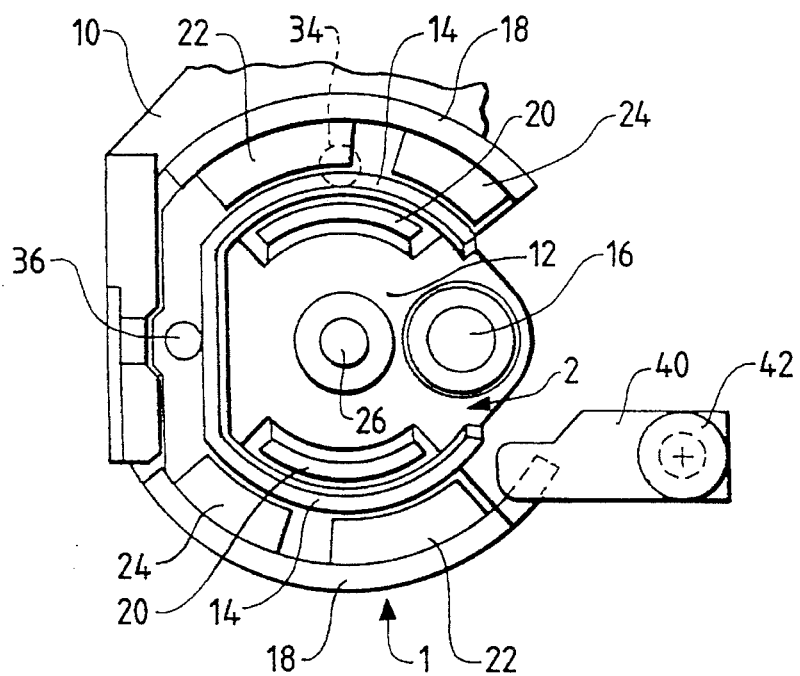
FIG. 2 is a plan view showing the objective actuator of FIG. 1.
Figure 3:
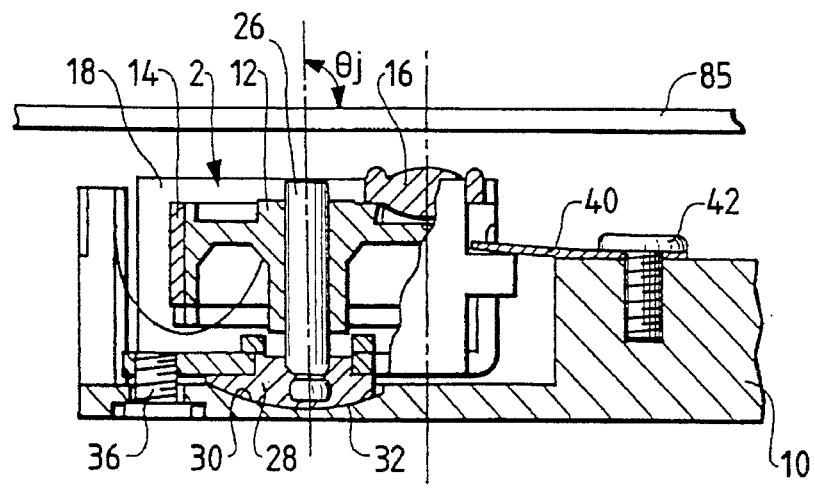
FIG. 3 is an elevational view in section showing the objective actuator of FIG. 1.

In FIGS. 1 through 3, a fixed unit 1 is located on a resin frame 10 integrally formed by molding. An outer yoke plate 18 as a first yoke, an inner yoke plate 20 as a second yoke, and a support shaft 26 are coupled together by resin into the fixed unit 1. A movable unit 2 is supported by the support shaft 26. Detailed description will proceed in the order of the frame 10, the fixed unit 1, and the movable unit 2.

Figure 4:
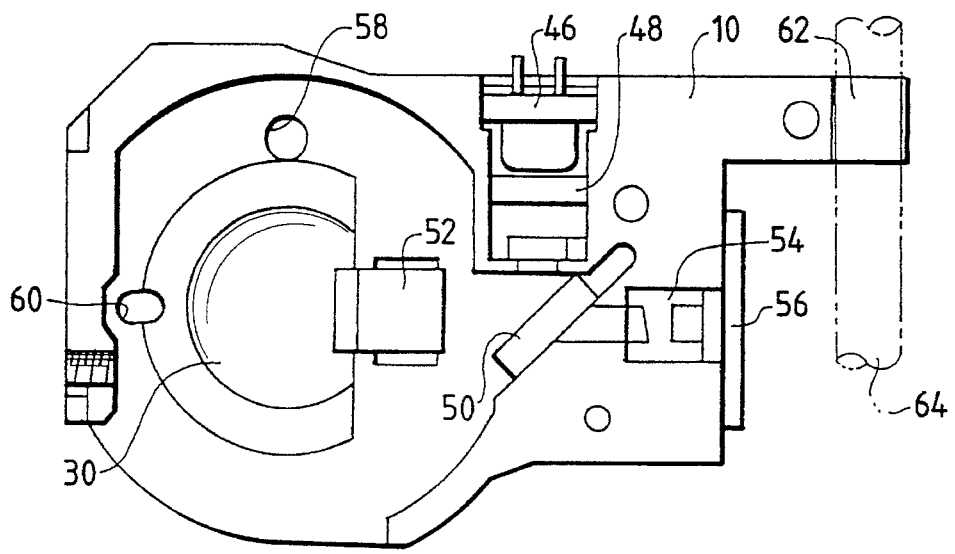
FIG. 4 is a plan view showing a frame used in the objective actuator.
Figure 5:
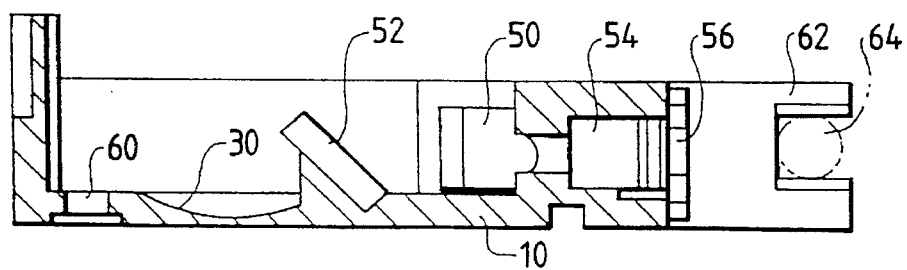
FIG. 5 is an elevational view in section showing the frame shown in FIG. 4.
Figure 6:
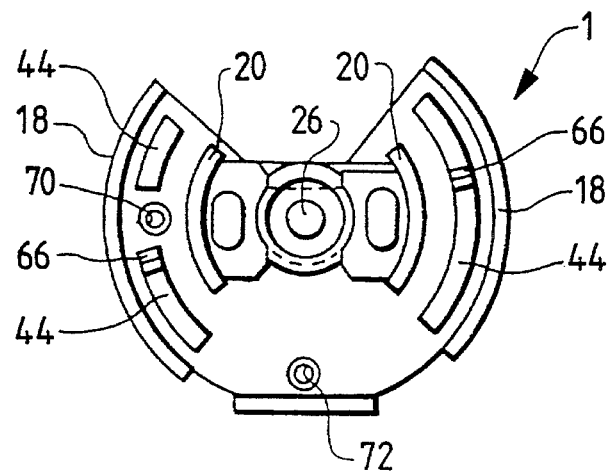
FIG. 6 is a plan view showing a fixed unit used in the objective actuator.
Figure 7:
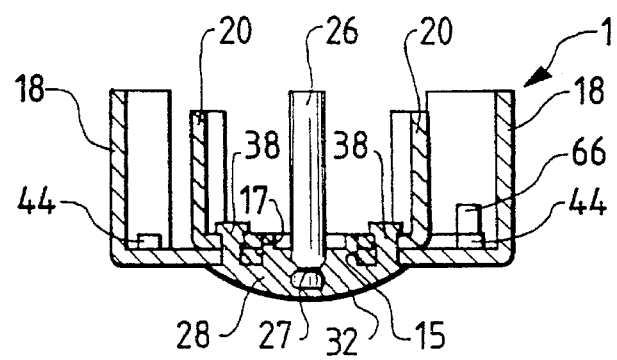
FIG. 7 is a sectional side elevation showing the fixed unit shown in FIG. 6.
Figure 8:
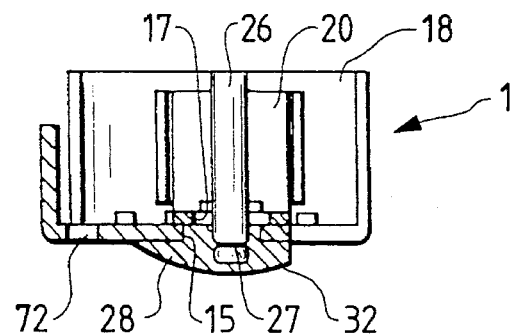
FIG. 8 is an elevational view in section showing the fixed unit.
Figure 9:
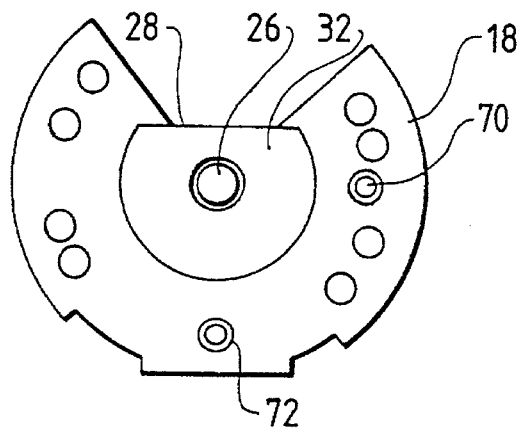
FIG. 9 is a bottom view showing the fixed unit.

In FIGS. 4 and 5, the frame 10 has a semiconductor laser 46 located at near to the center of the upper side thereof when longitudinally seen. A diffraction grating 48 and a beam splitter 50 are located on the path of a laser beam emitted from the semiconductor laser 46. The beam splitter 50 reflects and directs the laser beam to the side (to the left in the drawing). A mirror 52 is provided on the path of the laser beam that is reflected by the beam splitter 50. The mirror 52 reflects and directs the laser beam toward an objective lens and an optical disk, which will be described later. A sensor lens 54, serving also as an optical wedge, is located on the path of the laser beam which comes from the optical disk through the reverse route of the objective lens and the mirror 52, and through the beam splitter 50. A photo sensor 56 is located on the rear side (right side in the drawing) of the sensor lens 54. In the inner side of the bottom of the frame 10, a spherical cavity 30 is formed and located closer to the left side as viewed in the drawing. Holes 58 and 60, formed in the bottom of the frame, are disposed around the spherical cavity 30 in a state that these holes are angularly spaced by 90° with respect to the center of the spherical cavity 30. A bifurcated guide 62 is formed at the right end (as viewed in the drawing) of the frame 10. The guide 62 receives the guide shaft 64, to allow the frame 10 to move along the guide shaft 64 vertically as viewed in the drawing of FIG. 4, viz., in the radial direction of the optical disk.

The fixed unit 1 will be described in detail. In FIGS. 6 through 9, the outer yoke plate 18 as a first yoke, which constitutes the fixed unit 1, is a circular plate that is partially cut out into a fan-like shape. A center hole 15 is formed in the central part of the outer yoke plate 18. The outer yoke plate 18 has separate side walls disposed oppositely with respect to the center hole 15 thereof. In this instance, the side walls are formed by bending the corresponding portions of the outer circumferential edge of the outer yoke plate 18. Within the outer yoke plate 18, the inner yoke plate 20 as a second yoke is placed on the bottom of the outer yoke plate 18. The inner yoke plate 20 has also separate side walls raised from the portions of the circumferential edge of the inner yoke plate 20, which the portions are oppositely disposed with respect to the center hole 17 thereof. These side walls of the inner yoke plate 20 are also formed by bending the corresponding portions of the outer circumferential edge of the inner yoke plate 20. Screw holes 70 and 72 are formed in the outer yoke plate 18 at locations closer to the outer side thereof and angularly spaced by 90° with respect to the center of the outer yoke plate 18. These locations overlap with the locations of the holes 58 and 60 of the frame 10.

The side walls of the outer yoke plate 18 confront with corresponding wide walls of the inner yoke plate 20 with given gaps being present therebetween, as shown. Through-holes are formed in the bottom portions of the outer yoke plate 18 and the inner yoke plate 20 where those plates are placed one on the other. Resin rivet parts 38 are integrally formed by molding. At this time, resin flows through those through-holes of the outer yoke plate 18 and the inner yoke plate 20. As a result, these plates are coupled together. A base 28 is formed by filling the center holes of the outer and inner yoke plates 18 and 20 with resin in the process of the integrally molding. With the base 28, the support shaft 26 and the inner and outer yoke plates 20 and 18 are coupled together into a one-piece construction. The bottom surface of the base 28 is spherically shaped into an adjust surface 32 for adjusting a tilt or inclination angle of the support shaft 26. The adjust surface 32 will be described in detail later. The diameter of each of the center holes 15 and 17 of the yokes 20 and 18 is larger than that of the support shaft 26. In the molding process, the support shaft 26 is inserted into the center holes 15 and 17, with a sufficient empty space therebetween, and is positioned in place. In this state, the structure is subjected to the integrally molding. Resin filling the holes 15 and 17 forms the base 28. A circumferential groove 27 is previously formed in the portion of the support shaft 26 where is molded. The circumferential groove 27 functions to prevent the support shaft 26.after integrally molding from becoming disengaged. Scratches of the support shaft 26 which are formed by nipping the support shaft 26 by a suitable tool before the support shaft 26 is inserted into a mold, may be used for the same purpose. In this case, the support shaft 26 may be supplied without regard to its direction, while the direction of the support shaft 26 must be considered in supplying the support shaft 26 having the circumferential groove. Accordingly, a better workability is obtained.

Raised parts 44, for positioning a drive magnet to be given later, are raised from the bottom of the outer yoke plate 18 in a state that those parts 44 extend along and located closer to the side walls thereof. The raised parts 44 are formed in the above-mentioned process of the integrally molding. Protrusions 66 protruded from the raised parts 44 are integral therewith. The raised parts 44 are used for positioning the drive magnet in the direction of its height, while the protrusions 66 for positioning the drive magnet in the circumferential direction thereof.

The outer yoke plate 18 as the first yoke, the inner yoke plate 20 as the second yoke, and the support shaft 26 are positioned in place within the mold, and then those are integrally connected by molding. The positional relationship among the outer yoke plate 18, the inner yoke plate 20, and the support shaft 26, particularly the verticality of the support shaft 26 relative to the yoke plates 18 and 20, directly affects the precision of the mold. Accordingly, the mold, if precisely manufactured, will provide a satisfactorily precision in the positional relationship among them and the verticality of the support shaft.

As shown in FIGS. 1 through 3, a focusing drive magnet 22 and a tracking drive magnet 24 are bonded onto the opposed side walls of the outer yoke plate 18 by proper adhesive. In this case, the raised parts 44 on which the drive magnets 22 and 24 are placed position those magnets in the direction of the shaft 26. The protrusions 66 protruded from the raised parts positions the magnets 22 and 24 in the circumferential direction. The fixed unit 1 is thus constructed.

The fixed unit 1 is set in the frame 10 in a state that the spherical adjust surface 32 of the base 28 is put in the spherical cavity 30 of the frame 10. Adjust screws 34 and 36 are screwed into the screw holes 70 and 72, through the two holes 58 and 60 of the frame 10. One end of a plate spring 40 is secured to the frame 10 by means of a fixing screw 42. The distal end of the plate spring 40 pushes the part of the outer yoke plate 18, which is located furthest from the screw holes 70 and 72 of the outer yoke plate 18 with the support shaft 26 located therebetween. With such a structure, the fixed unit 1 can be tilted by fastening or loosening the adjust screws 34 and 36. That is, when these screws are fastened or loosened, the adjust surface 32, while being in slidable contact with the spherical cavity 30, is turned about its center by the elastic force of the plate spring 40 or resisting the force. Specifically, the support shaft 26 can be adjusted within an angle θr by means of the adjust screw 34 (in the radial direction of the optical disk), as shown in FIG. 1. As shown in FIG. 3, the shaft can also be adjusted within another angle θj orthogonal to the angle θr by means of the adjust screw 36 (in the disk track direction of the optical disk). The adjust screw 36 is located at the position angularly separated by 90° from the adjust screw 34. In this way, the tilt angles of the support shaft 26 against the frame 10 can be precisely adjusted. The details of this will be described later.

The movable unit 2 is coupled with the support shaft 26 in a state that it is movable both along the support shaft 26 and about the support shaft 126. The movable unit 2 includes an objective or object lens holder 12. The lens holder 12 is fit to the support shaft 26 so that it is movable along and about the support shaft 26. The lens holder 12 includes a lens holding frame for holding an object lens 16 and a drive coil 14 fixed thereto. The lens holding frame is formed integral with the lens holder 12. The object lens 16 is located on the optical path of the laser beam reflected by the mirror 52 already described referring to FIGS. 4 and 5. The object lens 16 focuses the laser beams on recording pits of the optical disk 85, and guides the laser beam reflected by the optical disk 85 to the mirror 52. The drive coil 14 is a sheet like coil formed such that a plural number of spiral pattern coils are sandwiched by insulating means. The sheet-like coil is C-shaped, and secured to the circumferential outer surface of the lens holder 12. Two pattern coils are provided, one for the focusing drive coil and the other for the tracking drive coil. The focusing drive coil is disposed in opposition to the focusing drive magnet 22, while the tracking drive coil is disposed in opposition to the tracking drive magnet 24.

In the first embodiment thus far described, when the frame 10 moves along a guide shaft 64, the whole objective actuator moves, whereby a seek motion (the motion in the radial direction of the optical disk) is carried out. The movable unit 2 including the object lens 16 is moved in the direction of the support shaft 26 by a drive force, thereby effecting the focussing control. When a controlled current is fed to the focusing drive coil, the drive force is developed between the drive coil and the focusing drive magnet 22. The movable unit 2 including the object lens 16 is turned about the support shaft 26 by a drive force by a drive force, thereby effecting the tracking control. When a controlled current is fed to the tracking drive coil, the drive force is developed between the drive magnet and the tracking drive magnet 24.

As described above, the center holes 15 and 17, larger in diameter than the support shaft 26 supporting the fixed unit 1, are formed in the yoke plates 18 and 20. The support shaft 26, and the yoke plates 18 and 20 are coupled into a one-piece construction by the integrally molding process. Resin filling the holes 15 and 17 of the yoke plates 18 and 20 forms the base 28. Accordingly, the mold, if manufactured with a high precision, almost eliminates the inclination of the support shaft 26, thereby improving the device precision and yield. Further, when the coated support shaft 26, even if entirely coated, is subjected to a mold process, the coating will not be peeled off. Therefore, there is eliminated the troublesome work to mask only a part of the support shaft 26 before it is coated. Additionally, the raised parts 44 and protrusions 66, which provide the reference surfaces of the drive magnets in the direction of the support shaft 26 and in the circumferential direction, and the spherical adjust surface 32 for the inclination adjustment of the whole movable unit 2 may also be molded simultaneously. This is advantageous in the device cost and precision. The assembling of a plural number of parts, such as the outer yoke plate 18, the inner yoke plate 20, and the support shaft 26, may be simultaneously carried out by the molding process. This feature also contributes to the cost reduction and precision improvement.

Figure 10:
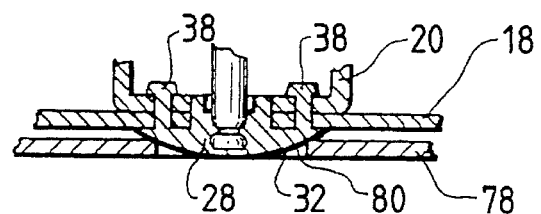
FIG. 10 is a cross sectional view showing a modification of the objective actuator of the first embodiment.
Figure 11:
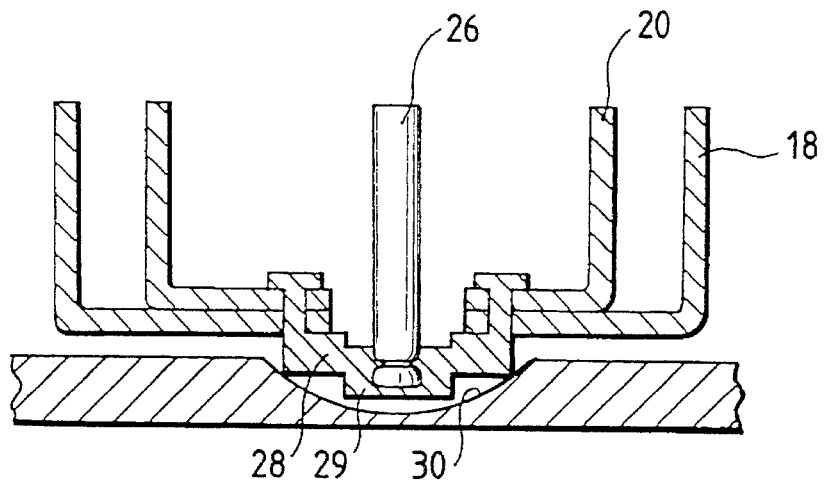
FIG. 11 is a sectional side elevation showing a key portion of another modification of the objective actuator of the first embodiment.

The shape of the receiving portion of the frame, which is for receiving the adjust surface 32, shaped spherical, for the tilt adjustment of the whole movable unit 2, is not necessary spherical. In an example shown in FIG. 10, a hole 80 formed in a frame 78 is used as a receiving portion. The hole 80 receives the adjust surface 32 with its circumferential edge. The adjust surface 32 may be received at three or more points. Alternatively, as shown in FIG. 11, the bottom end of the movable unit 2 may be formed into a protruded portion 29, shaped in cross section, where is put in the spherical cavity 30.

A second embodiment of an objective actuator according to the present invention will be described. The second embodiment is based on the improvement over the first embodiment of the present invention.

The second embodiment provides an extremely simple formation of the support shaft for rotatably and axially movably supporting the objective lens holder. An objective actuator provided by the second embodiment is excellent in the verticality of the support shaft and hence in the precision of the optical axis.

The second embodiment is characterized in that in the fixed unit 1, the support shaft 26 in the fixed unit 1 is molded by resin.

Accordingly, the description of the second embodiment will proceed placing emphasis on the fixed unit 1, while for the details of the frame 10 and the movable unit 2, reference is made to the corresponding descriptions already made.

Figure 14:
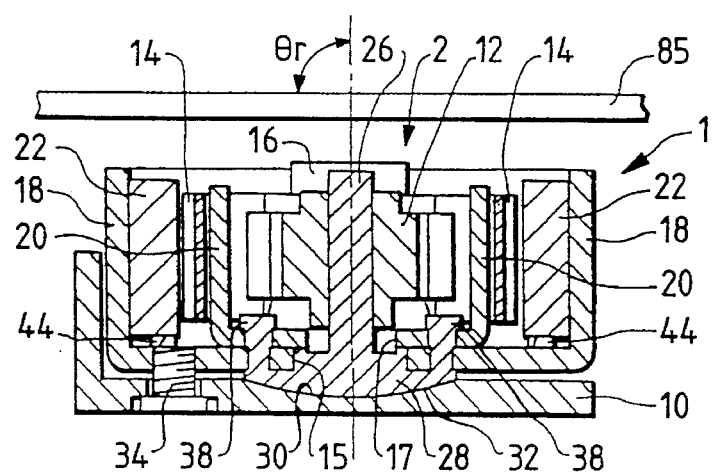
FIG. 14 is a plan view showing a fixed unit used in the objective actuator of FIG. 12.
Figure 15:
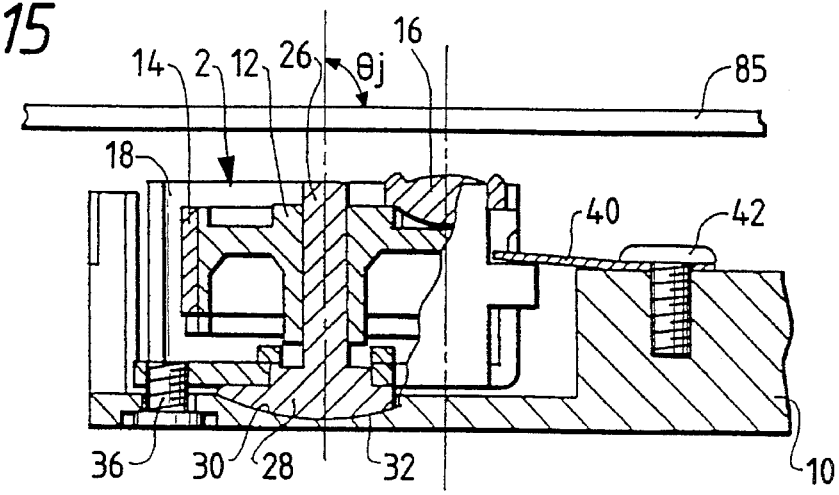
FIG. 15 is a sectional side elevation showing the fixed unit shown in FIG. 14.

As shown in FIGS. 14 and 15 schematically showing the construction of an objective actuator of the second embodiment, a fixed unit 1 is located on a resin frame 10 integrally formed by molding. An outer yoke plate 18 as a first yoke, an inner yoke plate 20 as a second yoke, which are coupled together by resin and a support shaft 26 integrally formed by molding resin are coupled together to obtain the fixed unit 1. A movable unit 2 is supported by the support shaft 26.

In FIGS. 12 through 15, the outer yoke plate 18, which constitutes the fixed unit 1, is a circular plate that is partially cut out into a fan-like shape. A center hole 15 is formed in the central part of the outer yoke plate 18. The outer yoke plate 18 has separate side walls disposed oppositely with respect to the center hole 15 thereof. In this instance, the side walls are formed by bending the corresponding portions of the outer circumferential edge of the outer yoke plate 18. Within the outer yoke plate 18, the inner yoke plate 20 is placed on the bottom of the outer yoke plate 18. The inner yoke plate 20 has also separate side walls raised from the portions of the circumferential edge of the inner yoke plate 20, which the portions are oppositely disposed with respect to the center hole 17 thereof. These side walls of the inner yoke plate 20 are also formed by bending the corresponding portions of the outer circumferential edge of the inner yoke plate 20. Screw holes 70 and 72 are formed in the outer yoke plate 18 at locations closer to the outer side thereof and angularly spaced by 90° with respect to the center of the outer yoke plate 18. These locations overlap with the locations of the holes 58 and 60 of the frame 10.

The side walls of the outer yoke plate 18 confront with corresponding wide walls of the inner yoke plate 20 with given gaps being present therebetween, as shown. Through-holes are formed in the bottom portions of the outer yoke plate 18 and the inner yoke plate 20 where those plates are placed one on the other. Resin rivet parts 38 are integrally formed by molding. At this time, resin flows through those through-holes of the outer yoke plate 18 and the inner yoke plate 20. As a result, these plates are coupled together. A base 28 is formed by filling the center holes of the outer and inner yoke plates 18 and 20 with resin in the process of the integrally molding. It is noted here that this molding process forms a support shaft 26 standing erect on the base 28 through the center hole 17 of the inner yoke plate 20. The bottom surface of the base 28 is spherically shaped into an adjust surface 32 for adjusting a tilt angle of the support shaft 26. The adjust surface 32 will be described in detail later.

Raised parts 44 for positioning a drive magnet to be given later, are raised from the bottom of the outer yoke plate 18 in a state that those parts 44 extend along and located closer to the side walls thereof. The raised parts 44 are formed in the above-mentioned process of the integrally molding. Protrusions 66 protruded from the raised parts 44 are integral therewith. The raised parts 44 are used for positioning the drive magnet in the direction of its height, while the protrusions 66 for positioning the drive magnet in the circumferential direction thereof.

The outer yoke plate 18, the inner yoke plate 20, and the support shaft 26 are positioned in place within the mold, and then those are integrally connected by molding. The positional relationship among the outer yoke plate 18, the inner yoke plate 20, and the support shaft 26, particularly the verticality of the support shaft 26 relative to the yoke plates 18 and 20 depends on the precision of the mold. Accordingly, the mold, if precisely manufactured, will provide a satisfactorily precision in the positional relationship among them and the verticality of the support shaft.

As shown in FIGS. 12 through 15, a focusing drive magnet 22 and a tracking drive magnet 24 are bonded onto the opposed side walls of the outer yoke plate 18 by proper adhesive. In this case, the raised parts 44 on which the drive magnets 22 and 24 are placed position those magnets in the direction of the shaft 26. The protrusions 66 protruded from the raised parts positions the magnets 22 and 24 in the circumferential direction. The fixed unit 1 is thus constructed.

Figure 12:
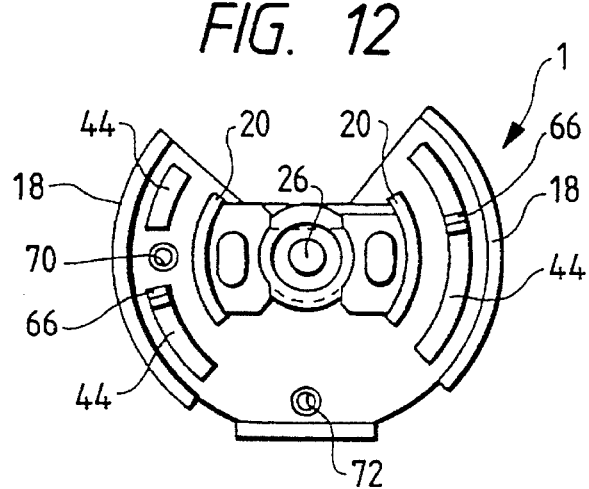
FIG. 12 is a sectional side elevation showing an objective actuator according to a second embodiment of the present invention.
Figure 13:
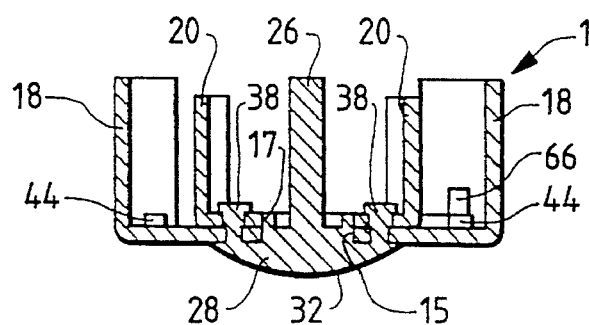
FIG. 13 is an elevational view in section showing the objective actuator of FIG. 12.

The fixed unit 1 is set in the frame 10 in a state that the spherical adjust surface 32 of the base 28 is put in the spherical cavity 30 of the frame 10. Adjust screws 34 and 36 are screwed into the screw holes 70 and 72, through the two holes 58 and 60 of the frame 10. One end of a plate spring 40 is secured to the frame 10 by means of a fixing screw 42. The distal end of the plate spring 40 pushes the part of the outer yoke plate 18, which is located furthest from the screw holes 70 and 72 of the outer yoke plate 18 with the support shaft 26 located therebetween. With such a structure, the fixed unit 1 can be tilted by fastening or loosening the adjust screws 34 and 36. That is, when these screws are fastened or loosened, the adjust surface 32, while being in contact with the spherical cavity 30, is turned about its center by the elastic force of the plate spring 40 or resisting the force. Specifically, the support shaft 26 can be adjusted within an angle $\theta r$ by means of the adjust screw 34 (in the radial direction of the optical disk), as shown in FIG. 12. As shown in FIG. 3, the shaft can also be adjusted within another angle $\theta j$ orthogonal to the angle $\theta r$ by means of the adjust screw 36 (in the disk track direction of the optical disk). The adjust screw 36 is located at the position angularly separated by 90° from the adjust screw 34. In this way, the tilt angles of the support shaft 26 against the frame 10 can be adjusted. The details of this will be described later.

In the second embodiment as in the first embodiment, when the frame 10 moves along a guide shaft 64, the whole objective actuator moves, whereby a seek motion (the motion in the radial direction of the optical disk) is carried out. The movable unit 2 including the object lens 16 is moved in the direction of the support shaft 26 by a drive force, thereby effecting the focussing control. When a controlled current is fed to the focusing drive coil, the drive force is developed between the drive coil and the focusing drive magnet 22. The movable unit 2 including the object lens 16 is turned about the support shaft 26 by a drive force by a drive force, thereby effecting the tracking control. When a controlled current is fed to the tracking drive coil, the drive force is developed between the drive magnet and the tracking drive magnet 24.

Filler for sliding motion improvement, such as carbon fiber or Teflon (trade name), is preferably blended into the resin used for the integrally molding. Use of the resin blended with the filler ensures a smooth sliding of the movable unit 2 along the support shaft 26 not coated and a smooth rotation of the same about the shaft as well.

The second embodiment of the present invention thus far described has the following beneficial effects.

1) The support shaft 26, together with the outer and inner yoke plates 18 and 20 as the first and second yokes, is integrally formed by molding. There is eliminated an additional process step for forming the support shaft 26. The formation of the support shaft 26 is very simple. Reduction of manufacture cost is realized.

2) When the filler-contained molding resin is used, there is no need of coating the surface of the support shaft 26. Accordingly, the coating film damage and peel-off problems will not be created. Accordingly, the resultant objective actuator is extremely reliable. Further, since the filler is deeply diffused into the resin, even if the surface is worn out, another filler contained surface appears. In this respect, the objective actuator is free from the performance reduction by abrasion.

3) The resin has an excellent vibration impeding function. Accordingly, the resin support shaft 26 impedes harmful vibration to allow little vibration to be transmitted to the movable unit 2.

4) The mold, if highly precisely manufactured, is capable of minimizing a tilt of the support shaft 26. The optical pick-up device, if it incorporates the objective actuator of the invention, is improved in its performances. Further, if the resin is blended with filler, the vibration impeding function is further improved because of the internal friction of the resin as the base with the filler.

5) Since the support shaft 26 is integrally formed by molding by resin, the base of the support shaft 26 can be reinforced by the resin flowing thereabout. Further, the entire length of the support shaft 26 including the flowing-about resin portion is shorter than that of the support shaft 26 that is mounted by press-fitting or bonding. This leads to the size reduction of the objective actuator.

6) Additionally, the raised parts 44 and protrusions 66, which provide the reference surfaces of the drive magnets in the direction of the support shaft 26 and in the circumferential direction, and the spherical adjust surface 32 for the inclination adjustment of the whole movable unit 2 may also be molded simultaneously. This is advantageous in the device cost and precision. The assembling of a plural number of parts, such as the outer yoke plate 18 and the inner yoke plate 20, may be simultaneously carried out by the molding process. This feature also contributes to the cost reduction and precision improvement.

Figure 16:
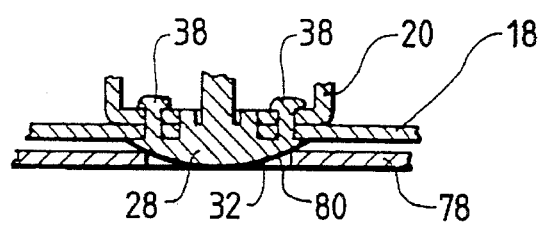
FIG. 16 is a cross sectional view showing a modification of the objective actuator of the second embodiment.

The shape of the receiving portion of the frame, which is for receiving the adjust surface 32, shaped spherical, for the tilt adjustment of the whole movable unit 2, is not necessary spherical. In an example shown in FIG. 16, a hole 80 formed in a frame 78 is used as a receiving portion. The hole 80 receives the adjust surface 32 with its circumferential edge. The adjust surface 32 may be received at three or more number of points.

A tilt angle adjust mechanism according to a third embodiment of the present invention will be described with reference to FIGS. 17 through 20.

In the optical pick-up device for optically picking up data signals by hitting an optical disk with a laser beam, it is required to reduce the diameter of the light beam spot as small as possible in order to maximize the object lens performance. To this end, it is necessary to minimize an inclination of the optical axis of the object lens against the optical disk.

According to a third embodiment of the present invention, there is provided a novel and unique tilt angle adjust mechanism for an optical pick-up device. The tilt angle adjust mechanism succeeds in remarkably reducing a play between the objective actuator and the frame in the rotation direction. Accordingly, a positional variation of the object lens at a natural position is reduced. Further, the tilt adjustment of the object lens in the disk track direction where a high precision is required can be carried out with a satisfactorily high precision. Additionally, the tilt angle adjust mechanism minimizes a variation of the adjusted angle in the radius direction by the adjustment of the inclination angle in the disk track direction.

The tilt angle adjust mechanism for an optical pick-up device will be described in detail with reference to the accompanying drawings. For simplicity, like reference numerals are used for designating like or equivalent portions in the figures used for explaining the first and second embodiments.

Figure 18:
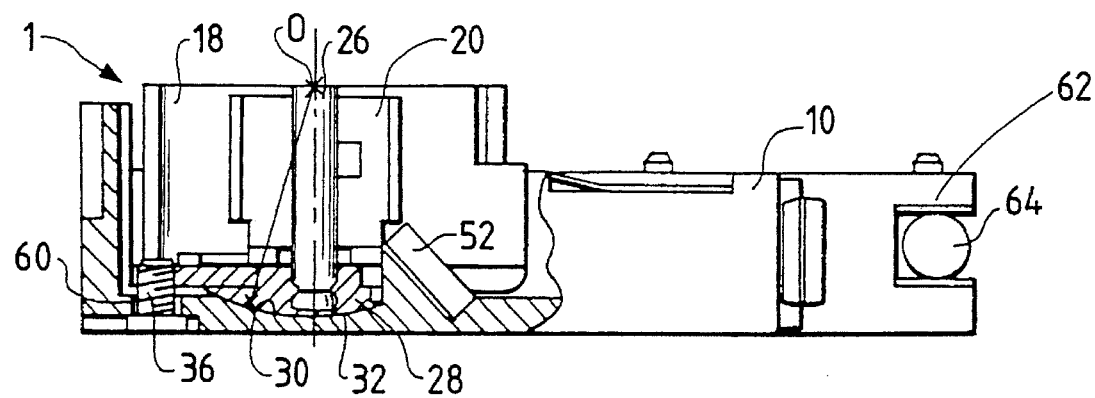
FIG. 18 is an elevational view partly in section showing the tilt angle adjust mechanism of FIG. 17.

As shown in FIG. 18, in the inner side of the bottom of the frame 10, a spherical cavity 30 is formed and located closer to the left side as viewed in the drawing. Holes 58 and 60, formed in the bottom of the frame, are disposed around the spherical cavity 30 in a state that these holes are angularly spaced by 90° with respect to the center of the spherical cavity 30. A bifurcated guide 62 is formed at the right end (as viewed in the drawing of FIG. 18) of the frame 10. The guide 62 receives the a guide shaft 64, to allow the frame 10 to move along the guide shaft 64 vertically as viewed in the drawing of FIG. 19, viz., in the radial direction of the optical disk.

Figure 17:
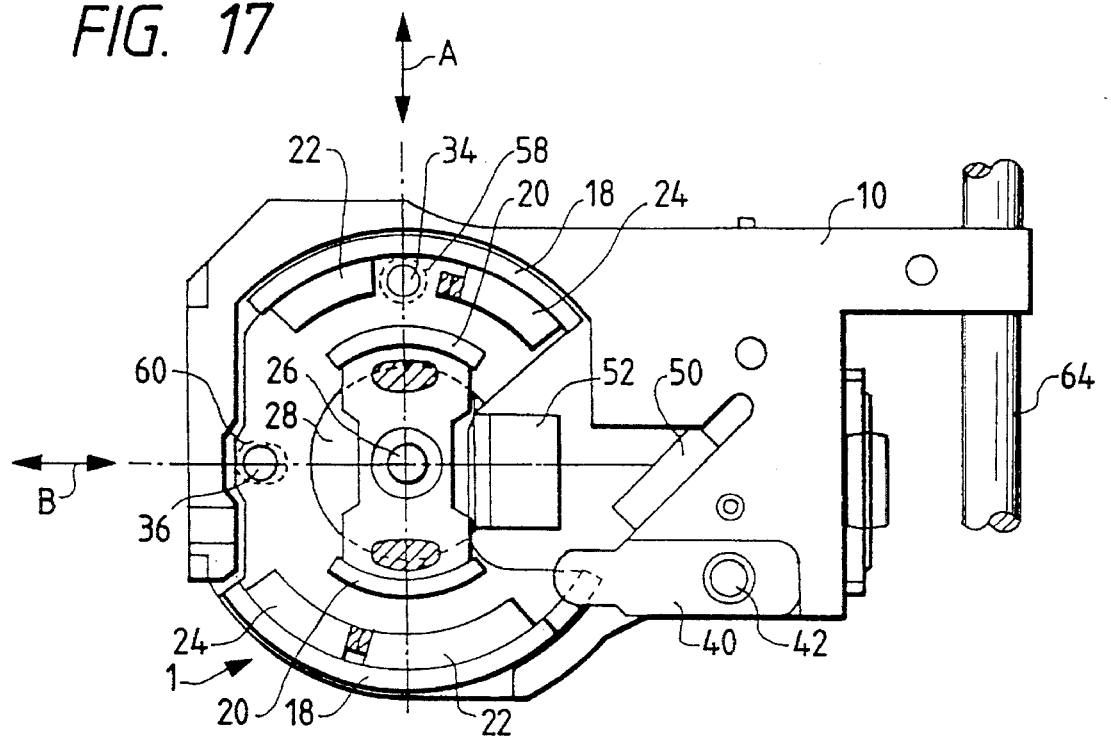
FIG. 17 is a plan view showing a tilt angle adjust mechanism according to a third embodiment of the present invention.

As shown in FIG. 17, a focusing drive magnet 22 and a tracking drive magnet 24 are bonded onto the opposed side walls of the outer yoke plate 18 by proper adhesive. The outer yoke plate including the magnets 22 and 24 make up a fixed unit 1. The fixed unit 1 is set in the frame 10 in a state that the spherical adjust surface 32 of the base 28 is put in the spherical cavity 30 of the frame 10. Adjust screws 34 and 36 are screwed into the screw holes 70 and 72, through the two holes 58 and 60 of the frame 10. One end of a plate spring 40 is secured to the frame 10 by means of a fixing screw 42. The diameter of the hole 58 is larger than the outer diameter of the adjust screw 34. The hole 60 is elongated in the disk track direction, and the width (as viewed in the radius direction) of the elongated hole is substantially equal to the outer diameter of the adjust screw 36.

Figure 19:
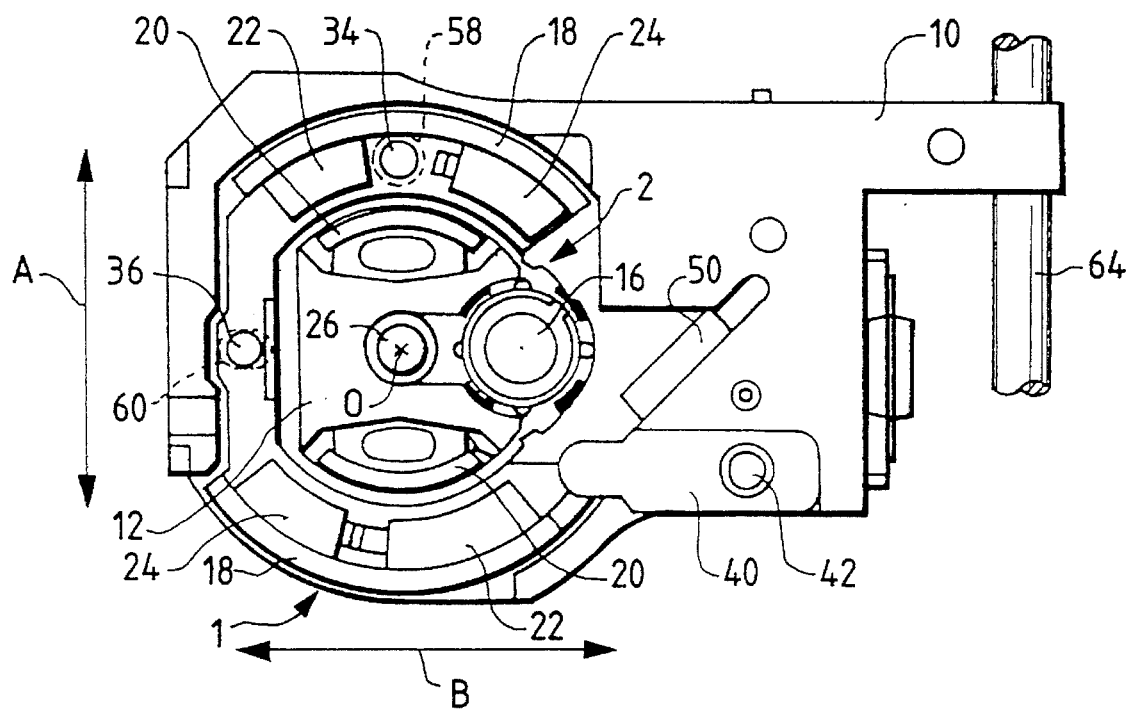
FIG. 19 is a plan view showing the tilt angle adjust mechanism shown in FIG. 17 where a movable unit is removed.
Figure 20:
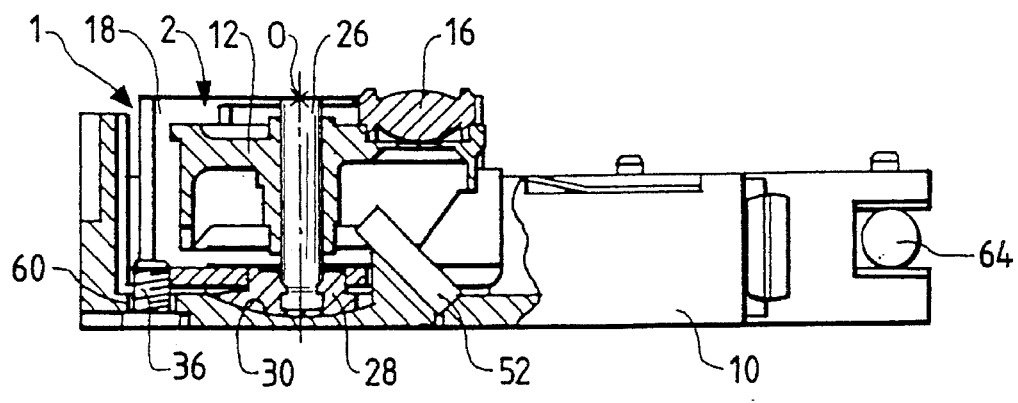
FIG. 20 is an elevational view partly in section showing the tilt angle adjust mechanism shown in FIG. 19.
Figure 21:
FIG. 21 is a front view showing a support shaft used in a conventional objective actuator.
Figure 22:
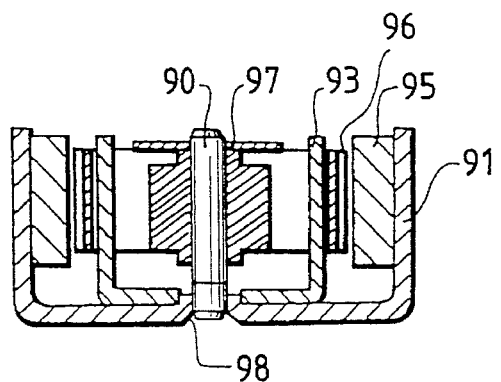
FIG. 22 is an elevational view in section showing a conventional objective actuator.

In FIGS. 19 and 20, the lens holder 12 is supported by the support shaft 26 in a manner that it is slidable along the support shaft 26 and rotatable about the same. The lens holder 12 holds the object lens 16 at a position off the support shaft 26. A focusing drive coil and a tracking drive coil are firmly provided on the segmented circumferential side walls. The focusing drive coil is disposed between the focusing drive magnet 22 and the inner yoke plate 20. The tracking drive coil is disposed between the tracking drive magnet 24 and the inner yoke plate 20. As well known, when a controller current is fed to the focusing drive coil, the lens holder 12 is moved along the support shaft 26, and the object lens 16 is moved in the optical axis direction, whereby effecting the focusing control. When a controlled current is fed to the tracking drive coil, the lens holder 12 is turned about the support shaft 26, whereby the object lens 16 moves in the radius direction, thereby effecting the tracking control. Thus, the fixed unit 1 and the movable unit 2 make up an objective actuator for moving the object lens 16 in the disk radius direction and the disk track direction.

One end of a plate spring 40 is secured to the frame 10 by means of a fixing screw 42. The distal end of the plate spring 40 pushes the part of the outer yoke plate 18, which is located furthest from the screw holes 70 and 72 of the outer yoke plate 18 with the support shaft 26 located therebetween. With such a structure, the fixed unit 1 can be tilted by fastening or loosening the adjust screws 34 and 36. That is, when these screws are fastened or loosened, the adjust surface 32, while being in contact with the spherical cavity 30, is turned about its center 0 by the elastic force of the plate spring 40 or resisting the force. Specifically, the tilt angle of the object lens in the disk radius direction can be adjusted by means of the adjust screw 34, as shown in FIG. 19. The tilt angle of the object lens in the disk track direction B can also be adjusted by means of the adjust screw 36.

The hole 60 of the frame 10 into which the adjust screw 36 is inserted is elongated in the disk track direction.

Accordingly, when the tilt angle of the object lens in the disk radius direction is adjusted by means of the adjust screw 34, the adjust screw 36 is moved along the elongated hole 60 in its elongating direction. Consequently, the tilt angle in the disk track direction B is deviated. When the tilt angle of the object lens in the disk track direction B is adjusted by means of the adjust screw 36, the adjust screw 34 moves within the hole 58, so that the tilt angle of the object lens in the disk radius direction A is deviated. It is noted here that the adjust screw 36 is shifted only in the direction of its elongation, thereby to adjust the tilt angle in the disk track direction B. Because of this, the tilt angle is little deviated in the disk radius direction A.

Thence, after the tilt angle in the disk radius direction A is adjusted by the adjust screw 34, the tilt angle in the disk track direction B is adjusted by the adjust screw 36. In this adjusting method, if the tilt angle in the disk radius direction A is deviated as the result of adjustment of the tilt angle in the disk track direction B by the adjust screw 36, the deviation created is slight in quantity. The fact that the deviation of the tilt angle in the disk radius direction A has a less influence on the jitter characteristic of the optical pick-up device when operating in a playback mode than the deviation of the tilt angle in the disk track direction B, has been known. Accordingly, the above adjusting method is sure to provide a tilt angle adjust mechanism for an optical pick-up device with excellent jitter performances.

As described above, in the construction of the third embodiment, the adjust screw 34 for adjusting the tilt angle in the disk radius direction A is screwed into the objective actuator through the hole 58. The adjust screw 36 for adjusting the tilt angle in the disk track direction B is screwed into the objective actuator through the elongated hole 60 allowing the movement only in the disk track direction B. The elongated hole 60 minimizes a rotational play of the objective actuator including the fixed unit 1 and the movable unit 2 against the frame 10. A positional variation of the object lens 16 at a natural position is reduced.

According to the present invention, the center holes which are larger in diameter than the support shaft supporting the objective lens holder are formed in the yokes. The support shaft, and the yokes are coupled into a one-piece construction by the integrally molding process. Resin filling the holes of the yokes forms the base. Accordingly, the mold, if manufactured with a high precision, almost eliminates the inclination of the support shaft, thereby improving the device precision and yield. Further, when the coated support shaft, even if entirely coated, is subjected to a mold process, the coating will not be peeled off. Therefore, there is eliminated the troublesome work to mask only a part of the support shaft before it is coated.

Additionally, the positioning parts for positioning the drive magnets against the yokes are also formed by the integrally molding process. Therefore, no provision of an additional step to provide the reference surfaces for positioning the drive magnets is required. This is advantageous in the cost to manufacture and device precision.

The adjust surface for adjusting a tilt angle of the support shaft is formed in the base. Accordingly, when the base is integrally formed by molding, the adjust surface is also formed simultaneously. Also in this respect, the cost reduction and the precision improvement are realized.

Furthermore, first and second yokes are oppositely disposed with the drive coil located therebetween. The support shaft, and the first and second yokes are coupled together by the integrally molding. Accordingly, the objective actuator having the first and second yokes can be manufactured in a simple manner and with a reduced cost.

Further, the present invention has the following beneficial effects.

The support shaft, together with the outer and inner yokes as the first and second yokes, is integrally formed by the molding. There is eliminated an additional process step for forming the support shaft. The formation of the support shaft is very simple. When the well slidable resin is used, there is no need of coating the surface of the support shaft. Accordingly, the coating film damage and peel-off problems will not be created. Accordingly, the resultant objective actuator is extremely reliable. The resin has an excellent vibration impeding function. Accordingly, the resin support shaft impedes harmful vibration to little allow the vibration to be transmitted to the movable unit. This contributes to the improvement of the performances of the optical pick-up device.

Additionally, the positioning parts for positioning the drive magnets against the yokes are also formed by the integrally molding process. Therefore, no provision of an additional step to provide the reference surfaces for positioning the drive magnets is required. This is advantageous in the cost to manufacture and device precision.

The base has the adjust surface for adjusting a tilt angle of the support shaft. Accordingly, when the base is integrally formed by molding, the adjust surface is also formed simultaneously. Also in this respect, the cost reduction and the precision improvement are realized.

Furthermore, first and second yokes are oppositely disposed with the drive coil located therebetween. The first and second yokes are coupled together by the integrally molding. Accordingly, the objective actuator having the first and second yokes can be manufactured in a simple manner and with a reduced cost.

According to the present invention, the adjust screw for adjusting the tilt angle in the disk radius direction is screwed into the objective actuator through the hole. The adjust screw for adjusting the tilt angle in the disk track direction is screwed into the objective actuator through the elongated hole extended in the disk track direction, which allows the movement only in the disk track direction. The elongated hole 60 minimizes a rotational play of the objective actuator against the frame. A positional variation of the object lens at a natural position is reduced.

After the tilt angle in the disk radius direction A is adjusted by the adjust screw, the tilt angle in the disk track direction is adjusted by the adjust screw. In this adjusting method, if the tilt angle in the disk radius direction is deviated as the result of adjustment of the tilt angle in the disk track direction by the adjust screw, the deviation created is slight in quantity. Since the deviation of the tilt angle in the disk radius direction has a less influence on the jitter characteristic of the optical pick-up device when operating in a playback mode than the deviation of the tilt angle in the disk track direction, the adjusting method is sure to provide a tilt angle adjust mechanism for an optical pick-up device with excellent jitter performances.

What is claimed is:

1. An objective actuator comprising:

an object lens holder for holding an object lens, the object lens holder being mounted on a support shaft in a manner that the object lens holder is slidable along and rotatable about the support shaft;

a drive coil mounted on the object lens holder;

first yoke, formed by molding, provided with drive magnets, the first yoke being mounted in such manner that the drive magnets confront with the drive coil, the first yoke having a center hole which is larger in diameter than the support shaft, the first yoke and the support shaft being integrally connected by molding, the first yoke having arc-shaped side walls integrally formed on an outer circumferential edge of the first yoke; and shaft holding means for stabilizing said support shaft, said shaft holding means including a shaft holding member defined by filling a resin at the center hole of the first yoke with the support shaft disposed in the center hole of the first yoke, the shaft holding member including a base portion.

2. An objective actuator as claimed in claim 1, further comprising:

positioning means for positioning the drive magnets against the first yoke, the positioning means being integrally formed by molding.

3. An objective actuator as claimed in claim 1, wherein the base portion includes an adjust surface for adjusting a tilt angle of the support shaft.

4. An objective actuator as claimed in claim 1, further comprising:

second yoke opposite to the first yoke through the drive coil, wherein the support shaft, the first yoke and the second yoke are integrally connected by molding.

5. An objective actuator comprising:

an object lens holder for holding an object lens, the object lens holder being mounted on a support shaft in a manner that the object lens holder is slidable along and rotatable about the support shaft;

a drive coil mounted on the object lens holder;

first yoke, formed by molding, provided with drive magnets, the first yoke being mounted in such manner that the drive magnets confront with the drive coil, the first yoke having arc-shaped side walls integrally formed on an outer circumferential edge of the first yoke; and an annular shaft holding member defined by filling resin in the center hole of the first yoke with the support shaft disposed in the center hole, said shaft holding member having a larger diameter than the support shaft, wherein the support shaft is integrally connected by molding together with the first yoke via the shaft holding member.

6. An objective actuator as claimed in claim 5, further comprising:

positioning means for positioning the drive magnets against the first yoke, the positioning means being integrally formed by molding.

7. An objective actuator as claimed in claim 5, wherein a base portion is formed at the same time of molding the support shaft and the first yoke and has an adjust surface for adjusting a tilt angle of the support shaft.

8. An objective actuator as claimed in claim 5, further comprising:

second yoke opposite to the first yoke through the drive coil, wherein the support shaft, the first yoke and the second yoke are integrally formed by molding.

9. An objective actuator comprising:

an object lens holder for holding an object lens, the object lens holder being mounted on a support shaft in a manner that the object lens holder is slidable along and rotatable about the support shaft;

a base member for fixing the support shaft;

a first yoke, formed by molding, having a center hole which is larger in diameter than the support shaft, said base member being formed by filling resin into the center hole with the support shaft disposed in the center hole, said first yoke having arc-shaped side walls integrally formed on an outer circumferential edge of said first yoke; and drive means for driving the object lens holder in such a manner that the object lens holder rotates about the support shaft and moves in the direction of the support shaft, wherein the base member and the support shaft are integrally connected by molding.

10. An objective actuator as claimed in claim 9, wherein the drive means includes a drive coil and a drive magnet are disposed to confront with each other.

* * * * *